(12) United States Patent
Lee et al.

(10) Patent No.: US 12,311,914 B2
(45) Date of Patent: May 27, 2025

(54) HYBRID ELECTRIC VEHICLE AND A SHIFT CONTROL METHOD FOR SAME

(71) Applicants: HYUNDAI MOTOR COMPANY, Seoul (KR); KIA CORPORATION, Seoul (KR)

(72) Inventors: Seul Gi Lee, Hwaseong-si (KR); Sang Kook Woo, Yongin-si (KR); Won Bin Lee, Suwon-si (KR); Soo Bang Lee, Suwon-si (KR); Jae Myoung Pi, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 359 days.

(21) Appl. No.: 17/944,576

(22) Filed: Sep. 14, 2022

(65) Prior Publication Data

US 2023/0339450 A1    Oct. 26, 2023

(30) Foreign Application Priority Data

Apr. 22, 2022    (KR) .................. 10-2022-0049894

(51) Int. Cl.
*B60W 10/08*    (2006.01)
*B60W 10/10*    (2012.01)
*B60W 20/13*    (2016.01)

(52) U.S. Cl.
CPC ............ *B60W 20/13* (2016.01); *B60W 10/08* (2013.01); *B60W 10/10* (2013.01); *B60W 2510/0208* (2013.01); *B60W 2510/087* (2013.01); *B60W 2510/1015* (2013.01); *B60W 2510/244* (2013.01); *B60W 2510/246* (2013.01);
(Continued)

(58) Field of Classification Search
CPC ...... B60W 20/10; B60W 20/13; B60W 10/08; B60W 10/10; B60W 30/19; B60W 2510/1015; B60W 2510/244; B60W 2510/0208; B60W 2510/087; B60W 2510/246; B60W 2510/10;
(Continued)

(56) References Cited

U.S. PATENT DOCUMENTS 9,085,227 B2    7/2015    Fournier et al.
9,221,334 B2    12/2015   Knoblauch
(Continued)

FOREIGN PATENT DOCUMENTS

JP    2004208421 A    7/2004
JP    2011036072 A    2/2011
(Continued)

*Primary Examiner* — Roger L Pang
(74) *Attorney, Agent, or Firm* — Lempia Summerfield Katz LLC (57) ABSTRACT

A shift control method of a hybrid electric vehicle includes: determining a speed control torque based on a result of comparing a speed of an input end of a transmission with a target speed of the input end of the transmission according to a shift signal; distributing the speed control torque to a second motor connected directly to the input end of the transmission; and distributing a residual speed control torque to a first motor connected selectively to the second motor through an engine clutch based on whether the engine clutch is locked up when the speed control torque is greater than a charging limit torque of the second motor.

19 Claims, 8 Drawing Sheets

(52) U.S. Cl.
CPC ................ *B60W 2710/083* (2013.01); *B60W 2710/1011* (2013.01)

(58) Field of Classification Search
CPC ... B60W 2510/1005; B60W 2710/083; B60W 2710/1011
USPC ...................................... 477/3, 5; 701/22, 53
See application file for complete search history.

(56) References Cited

U.S. PATENT DOCUMENTS

| | | | |
|---|---|---|---|
| 9,855,953 | B2 | 1/2018 | Bang |
| 10,300,908 | B2 * | 5/2019 | Ishida .................... B60K 6/547 |
| 2014/0371016 | A1 | 12/2014 | Knoblauch |
| 2016/0137205 | A1 | 5/2016 | Bang |
| 2016/0341309 | A1 | 11/2016 | Serrao et al. |
| 2017/0120898 | A1 * | 5/2017 | Kim ........................ B60K 6/48 |
| 2018/0099654 | A1 * | 4/2018 | Shin ...................... B60W 10/10 |
| 2023/0119802 | A1 * | 4/2023 | Park ..................... B60W 20/19 |
| | | | 701/22 |
| 2023/0146143 | A1 * | 5/2023 | Jo ......................... B60W 20/30 |
| | | | 701/22 |
| 2023/0373464 | A1 * | 11/2023 | Woo ..................... B60W 20/40 |

FOREIGN PATENT DOCUMENTS

| | | |
|---|---|---|
| JP | 2018001845 A | 1/2018 |
| JP | 2021160453 A | 10/2021 |
| KR | 20160059828 A | 5/2016 |
| KR | 101912980 B1 | 10/2018 |

* cited by examiner

HYBRID ELECTRIC VEHICLE AND A SHIFT CONTROL METHOD FOR SAME

CROSS-REFERENCE TO RELATED APPLICATION

The present application claims priority to Korean Patent Application No. 10-2022-0049894, filed Apr. 22, 2022, the entire contents of which are incorporated herein for all purposes by this reference.

BACKGROUND

1. Technical Field

The present disclosure relates to a hybrid electric vehicle and a shift control method for the same in which a consistent and sophisticated shift feeling can be secured during shifting.

2. Related Art

Recently, with increasing interest in environment, an eco-friendly vehicle equipped with an electric motor as a power source is becoming more common. The eco-friendly vehicle is also called an electrified vehicle, and representative examples thereof include a hybrid electric vehicle (HEV) and an electric vehicle (EV).

A hybrid vehicle can provide optimal output and torque depending on how an engine and an electric motor are operated harmoniously in the process in which the hybrid vehicle drives with two power sources composed of the engine and the electric motor.

Particularly, in a hybrid electric vehicle employing a parallel type hybrid system or a transmission mounted electric drive (TMED) hybrid system having the electric motor and an engine clutch (EC) mounted between the engine and a transmission, the output of an engine and the electric motor may be simultaneously transmitted to a drive shaft.

Meanwhile, when shifting is performed in the transmission, especially, in the process of upshifting, a vehicle may perform intervention control to reduce the kinetic energy of an input shaft of the transmission by reducing the torque of a drive source for efficient shifting and clutch protection.

However, when the hybrid electric vehicle performs intervention control, the speed of the input end of the transmission may not reach the target speed thereof due to disturbing factors such as viscosity change in oil of the transmission according to temperature, deviation of hydraulic response, deviation of the transmission and valve body, and torque error of the drive source.

In order to solve problem due to the disturbing factors, the hybrid electric vehicle performs the intervention control and an active shift control (ASC) mode in which the torque of the drive source (particularly, the electric motor) is controlled such that the speed of the input end of the transmission follows the target speed. Thus, a consistent and sophisticated shift feeling may be secured.

The matters described above as the background art are only for improving the understanding of the background of the present disclosure and should not be taken as acknowledging that they correspond to the prior art already known to those having ordinary skill in the art.

SUMMARY

Accordingly, the present disclosure has been made keeping in mind the above problems occurring in the related art.

The present disclosure is intended to propose a hybrid electric vehicle and a shift control method for the same in which speed control torque is distributed to each of a plurality of motors such that the speed of the input end of a transmission follows the target speed of the input end of the transmission during shifting. Thus, a consistent and sophisticated shift feeling can be secured.

Technical objectives intended to be achieved in the present disclosure are not limited to the technical objectives mentioned above, and other technical objectives not mentioned should be clearly understood by those having ordinary skill in the art to which the present disclosure belongs from the following description.

In order to achieve the above objectives, according to one aspect of the present disclosure, a shift control method of a hybrid electric vehicle is provided. The method includes determining a speed control torque based on a result of comparing a speed of an input end of a transmission with a target speed of the input end of the transmission according to a shift signal. The method also includes distributing the speed control torque to a second motor connected directly to the input end of the transmission. The method also includes distributing a residual speed control torque to a first motor connected selectively to the second motor through an engine clutch based on whether the engine clutch is locked up when the speed control torque is greater than a charging limit torque of the second motor.

In addition, according to another aspect of the present disclosure, a shift control method of a hybrid electric vehicle includes determining a speed control torque based on the result of comparing a speed of an input end of a transmission with a target speed of the input end of the transmission according to a shift signal. The method also includes determining an order of distributing the speed control torque to each of a first motor connected directly to an engine and a second motor connected directly to the input end of the transmission based on whether an engine clutch is locked up. The method also includes distributing the speed control torque to a priority motor of the first motor and the second motor. The method also includes distributing a residual speed control torque to a subordinate motor of the first motor and the second motor when the speed control torque is greater than a charging limit torque of the priority motor.

Furthermore, according to still another aspect of the present disclosure, a hybrid electric vehicle includes: an engine; a first motor connected directly to the engine; an engine clutch connected directly to the first motor; a second motor selectively connected to the first motor through the engine clutch; a transmission having an input end connected directly to the second motor; a first controller, which determines whether the transmission is required to be shifted; and a second controller. The second controller determines a speed control torque based on the result of comparing a speed of an input end of the transmission with a target speed of the input end of the transmission when receiving a shift signal from the first controller. The second controller also distributes the speed control torque to the second motor. The second controller also distributes a residual speed control torque to the first motor based on whether an engine clutch is locked up when the speed control torque is greater than a charging limit torque of the second motor.

According to the present disclosure, the speed control torque is distributed to each of the plurality of motors such that the speed of the input end of the transmission follows the target speed of the input end of the transmission during shifting. Thus, consistent and sophisticated shift feeling may be secured.

Effects, which can be obtained from the present disclosure, are not limited to the effect described above. Other effects not described above should be clearly appreciated from the following description by those having ordinary skill in the art.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Hereinafter, embodiments disclosed in the present specification are described in detail with reference to the accompanying drawings. The same or similar components are assigned the same reference numbers in the drawings and redundant descriptions thereof have been omitted. The terms "module" and "part" for the components used in the following description are given or mixed in consideration of only the ease of writing the specification and do not have distinct meanings or roles by themselves. In addition, when it is determined that detailed descriptions of related known technologies may obscure the gist of the embodiments disclosed in this specification in describing the embodiments disclosed in the present specification, the detailed description thereof has been omitted. In addition, the accompanying drawings are only for easily understanding the embodiments disclosed in this specification, and the technical idea disclosed herein is not limited by the accompanying drawings. The present disclosure should be construed as covering modifications, equivalents, and alternatives falling within ideas and technical scopes of the present disclosure.

Terms including an ordinal number, such as first and second, etc., may be used to describe various components, but the components are not limited by the terms. The above terms are used only for the purpose of distinguishing one component from another.

When a component is referred to as being "coupled" or "connected" to another component, it should be understood that the component may be directly coupled or connected to the another component or intervening components may be present therebetween. In contrast, when a component is referred to as being "directly coupled" or "directly connected" to another component, it should be understood that there is no intervening component present therebetween.

Singular forms are intended to include plural forms as well, unless the context clearly indicates otherwise.

In the present specification, it should be understood that terms such as "comprise" or "have" are intended to designate that the features, numbers, steps, operations, components, parts, or combinations thereof described in the specification exist. However, these terms do not preclude the possibility of the existence or addition of one or more other features, numbers, steps, operations, components, parts, or combinations thereof.

In addition, a unit or a control unit included in the names of a motor control unit (MCU) and a hybrid controller unit (HCU) is only a term widely used in the naming of a controller that controls the specific function of a vehicle. The unit or the control unit does not mean a generic function unit. For example, each control unit may include a communication device, which communicates with other control units or sensors for controlling a function in charge. Each control unit may also include a memory, which stores an operating system, a logic command, or input/output information. Each control unit may also include at least one processor, which performs judgment, calculation, and determination necessary for controlling the function in charge. When a component, device, element, or the like of the present disclosure is described as having a purpose or performing an operation, function, or the like, the component, device, or element should be considered herein as being "configured to" meet that purpose or to perform that operation or function.

Prior to explaining the configuration of the shift control system of a hybrid electric vehicle and a shift control method of the same according to the embodiments of the present disclosure, the structure and the control system of the hybrid electric vehicle applicable to the embodiments are first described.

Figure 1:
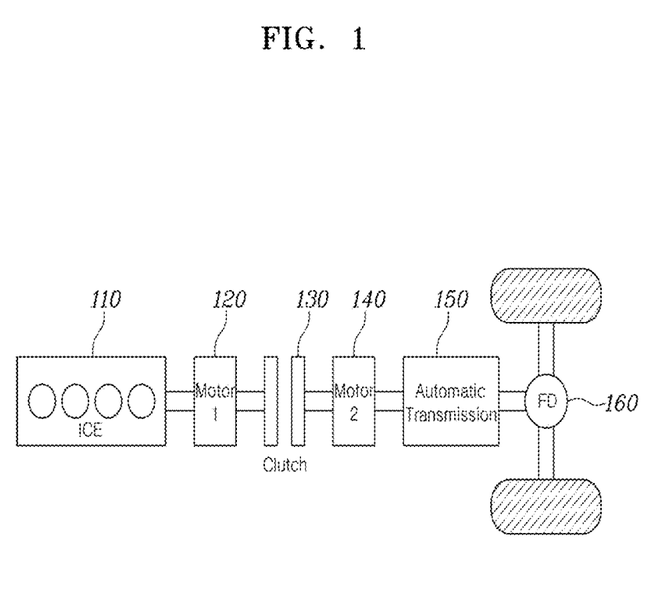
FIG. 1 shows an example of the configuration of a powertrain of a hybrid electric vehicle according to the embodiment of the present disclosure.

FIG. 1 shows an example of the configuration of a powertrain of the hybrid electric vehicle according to an embodiment of the present disclosure.

FIG. 1 illustrates a powertrain of a hybrid electric vehicle employing a parallel type hybrid system having two motors 120 and 140 and an engine clutch 130 mounted between an engine 110 (an internal combustion engine (ICE)) and a transmission 150 (a transmission). Such a parallel type hybrid system may be referred to as a transmission mounted electric drive (TMED) hybrid system since a second motor 140 is always connected to the input end of the transmission 150.

Here, a first motor 120 of the two motors 120 and 140 is disposed between the engine 110 and a first end of the engine clutch 130. The shaft of the engine 110 and the shaft of the first motor 120 may be connected directly to each other and rotate together at all times.

A first end of the shaft of the second motor 140 may be connected to a second end of the engine clutch 130, and a second end of the second motor shaft may be connected directly to the input end of the transmission 150. In other words, the second motor 140 may be selectively connected to the first motor 120 through the engine clutch 130.

The second motor 140 has a larger output than the first motor 120 and may function as a drive motor. Furthermore, the first motor 120 performs the function of a starter motor that cranks the engine 110 when the engine 110 is started. The first motor 120 may also recover the rotational energy of the engine 110 through power generation when the engine is off. The first motor 120 may also generate power with the power of the engine 110 while the engine 110 is running.

In the hybrid electric vehicle equipped with a powertrain as shown in FIG. 1, when a driver depresses an accelerator pedal after starting (for example, HEV ready), with the engine clutch 130 open, the power of a battery (not shown) is first used to drive the second motor 140. Accordingly, the power of the second motor 140 goes through the transmission 150 and a final drive (FD) 160 to move wheels (i.e., an EV mode). When a greater driving force is required as the vehicle gradually accelerates, the first motor 120 operates to crank the engine 110.

When the engine 110 and the second motor 140 have rotational speed difference therebetween within a predetermined range after the engine 110 starts, the engine clutch 130 is engaged therewith and the engine 110 and the second motor 140 rotate together (i.e., transition from the EV mode to an HEV mode). Accordingly, through a torque blending process, the output of the second motor 140 decreases and the output of the engine 110 increases. Thus, torque required by a driver is satisfied. In the HEV mode, the engine 110 may satisfy most of the required torque, and a difference between the torque of the engine and the required torque may be compensated through at least one of the first motor 120 and the second motor 140. For example, in consideration of the efficiency of the engine 110, when the engine 110 outputs a higher torque than the required torque, the first motor 120 or the second motor 140 generates as much power as the surplus of the torque of the engine. When the torque of the engine is less than the required torque, at least one of the first motor 120 and the second motor 140 may output insufficient torque.

When a preset engine off condition is satisfied, such as when a vehicle is decelerated, the engine clutch 130 is opened and the engine 110 is stopped (i.e., transition from the HEV mode to the EV mode). During deceleration of a vehicle, the driving force of wheels is used to charge the battery through the second motor 140, which is called braking energy recovery or regenerative braking.

Generally, the transmission 150 may use a step transmission or a multi-plate clutch, for example, a dual-clutch transmission (DCT).

Figure 2:
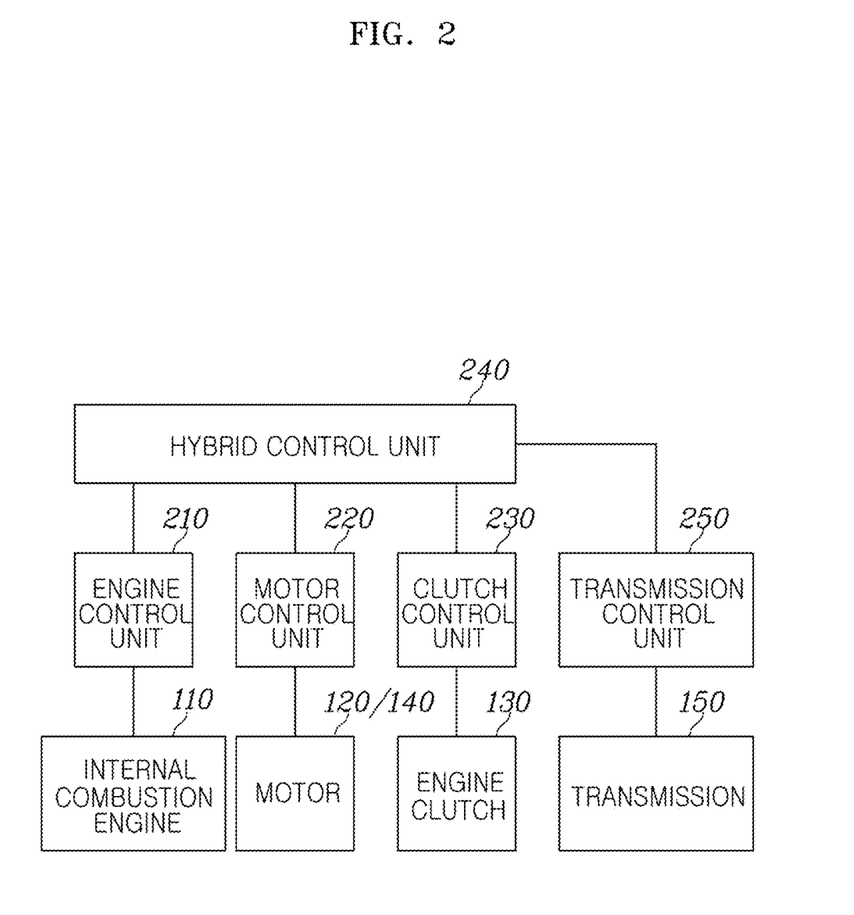
FIG. 2 shows an example of the configuration of a control system of the hybrid electric vehicle according to the embodiment of the present disclosure.

FIG. 2 shows an example of the configuration of a control system of the hybrid electric vehicle according to the embodiment of the present disclosure Referring to FIG. 2, in the hybrid electric vehicle to which the embodiments of the present disclosure can be applied, the engine 110 may be controlled by an engine controller 210, the torque of each of the first motor 120 and the second motor 140 may be controlled by a motor control unit (MCU) 220, and the engine clutch 130 may be controlled by a clutch controller 230. Here, the engine controller 210 is also referred to as an engine management system (EMS). Additionally, the transmission 150 is controlled by a transmission controller 250.

The motor control unit 220 may control a gate drive unit (not shown) based on the motor angle, phase voltage, phase current, and required torque of each motor 120 or 140 by a control signal of pulse width modulation (PWM). Accordingly, the gate drive unit may control an inverter (not shown) that drives each motor 120 or 140.

Each controller is connected to a hybrid controller unit (HCU) 240 as a superior controller, which controls the overall powertrain, including a mode conversion process. According to the control of the hybrid controller unit 240, each controller may provide information on a drive mode change, information required to control the engine clutch when shifting gears, and/or information required to control stopping the engine to the hybrid controller unit 240. Alternatively, each controller may perform an operation according to the control signal.

For example, the hybrid controller unit 240 determines whether to perform switching between EV and HEV modes or between CD and CS modes (in the case of a PHEV) according to the driving state of a vehicle. To this end, the hybrid controller unit determines the time to open the engine clutch 130 and performs hydraulic control during the opening. Furthermore, the hybrid controller unit 240 may determine the state (lock-up, slip, or open state) of the engine clutch 130 and may control the time to stop fuel injection of the engine 110. Furthermore, for the control of stopping the engine, the hybrid controller unit may transmit a torque command for controlling the torque of the first motor 120 to the motor control unit 220 so as to control the recovery of engine rotational energy. Additionally, in order to satisfy the required torque, the hybrid controller unit 240 may determine the state of each of drive sources 110, 120, and 140 and thus may determine required driving force for which the drive source 110, 120, or 140 is responsible so as to transmit a torque command to each of the controllers 210 and 220, which control the drive source.

Of course, it should be apparent to those having ordinary skill in the art that the above-described connection relationship between the controllers and the function/classification of each of controllers are examples and are not limited to the names of the controllers. For example, the hybrid controller unit 240 may be implemented such that associated functions thereof are provided in any one of other controllers except for the hybrid controller unit. The associated functions of the hybrid controller unit may be distributed to at least two controllers of other controllers.

The configuration of the hybrid electric vehicle shown in FIGS. 1 and 2 as described above is an example of the configuration of a hybrid electric vehicle. It should be apparent to those having ordinary skill in the art that the hybrid electric vehicle applicable to the embodiment is not limited to this configuration.

In the embodiment of the present disclosure, a hybrid electric vehicle is proposed in which a consistent and sophisticated shift feeling can be secured. Thus, when shifting is performed in the transmission 150, the speed control torque is distributed to each of the plurality of motors 120 and 140 such that the speed of the input end of the transmission 150 follows the target speed of the input end of the transmission 150. A structure for this is shown in FIG. 3.

Figure 3:
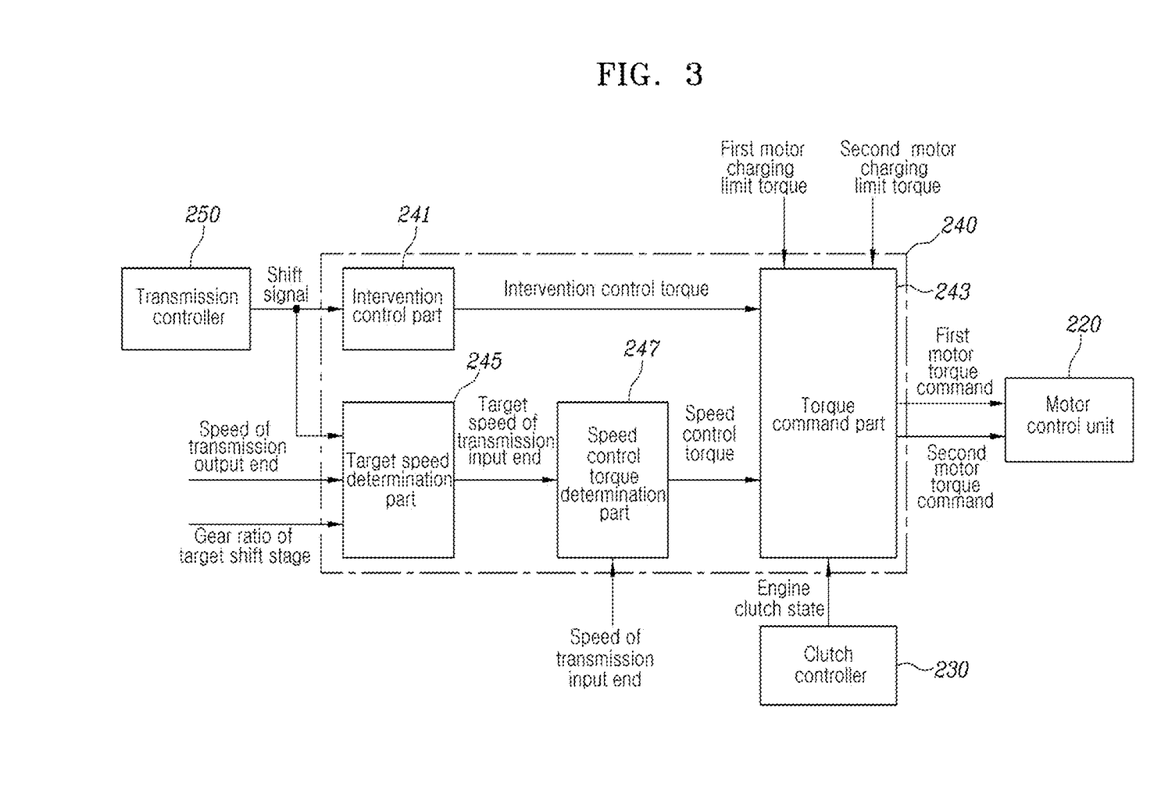
FIG. 3 shows an example of the configuration of a shift control system of the hybrid electric vehicle according to the embodiment of the present disclosure.

FIG. 3 is a block diagram showing an example of the configuration of a shift control system of the hybrid electric vehicle according to the embodiment of the present disclosure Referring to FIG. 3, the hybrid controller unit 240 may include an intervention control part 241, a torque command part 243, a target speed determination part 245, and a speed control torque determination part 247. The transmission controller 250 may determine whether the transmission 150 is required to be shifted.

When the intervention control part 241 receives a shift signal from the transmission controller 250, the intervention control part 241 may calculate intervention control torque on the basis of vehicle speed, an accelerator pedal sensor (APS) value, and a brake pedal sensor (BPS) value. In this case, the shift signal may be a request for intervention but is not necessarily limited thereto. Additionally, in the embodiment of the present disclosure, the intervention control part 241 calculates the intervention control torque. However, according to an embodiment, after determining the intervention control torque, the transmission controller 250 may transmit the intervention control torque to the hybrid controller unit

240. In this case, the intervention control part 241 may be removed from the hybrid controller unit 240.

The torque command part 243 may distribute the calculated intervention control torque to at least one of the engine 110, the first motor 120, or the second motor 140 and may perform intervention control.

However, when the hybrid electric vehicle performs the intervention control, due to a disturbing factor such as viscosity change in the oil of the transmission according to temperature, the speed of the input end of the transmission 150 may not reach the target speed thereof. Accordingly, hereinafter, a detailed description is made about an operation method in which the hybrid electric vehicle performs the intervention control and an active shift control (ASC) mode in which the torque of the motor is controlled such that the speed of the input end of the transmission 150 follows the target speed.

First, when the active shift control (ASC) mode activates after the target speed determination part 245 receives a shift signal from the transmission controller 250, the target speed determination part 245 may determine the target speed of the input end of the transmission 150 on the basis of the speed of the output end of the transmission 150 and the gear ratio of a target shift stage. More specifically, whether to activate the active shift control (ASC) mode may be determined by preset conditions such as a system limit condition, a diagnostic condition, and a shift progress rate for each shift class, etc. The target speed determination part 245 may determine the target speed of the input end of the transmission 150 by multiplying the speed of the output end of the transmission 150 by the gear ratio of the target shift stage.

The speed control torque determination part 247 may determine the speed control torque by comparing the speed of the input end of the transmission 150 with the target speed of the input end of the transmission 150. More specifically, the speed control torque determination part 247 may preset a torque corresponding to a difference between the speed of the input end of the transmission 150 and the target speed of the input end of the transmission 150 as the speed control torque.

The torque command part 243 compares the speed control torque with the charging limit torque of the first motor 120 and/or the charging limit torque of the second motor 140 on the basis of whether the engine clutch 130 is locked up. The torque command part 243 may also transmit a torque command to the motor control unit 220 so as to control torque for each of the first motor 120 and/or the second motor 140 according to the result of the comparison. Here, the charging limit torque of the first motor 120 means the sum of the current output torque of the first motor 120 and reverse torque corresponding to capacity capable of maximally charging the battery (not shown) with the first motor 120. The charging limit torque of the first motor 120 may be determined, by the SOC (State of Charge) of the battery, the internal temperature of the battery, the internal temperature of the first motor 120, and the speed-torque diagram of the first motor 120 (especially, under a high RPM condition). Likewise, the charging limit torque of the second motor 140 means the sum of the current output torque of the second motor 140 and reverse torque corresponding to capacity capable of maximally charging the battery with the second motor 140. The charging limit torque of the second motor 140 may be determined by the SOC of the battery, the internal temperature of the battery, and the speed-torque diagram of the second motor 140 (especially, under a high RPM condition).

The torque command part 243 may receive information on the state of the engine clutch 130 from the clutch controller 230 and may determine whether the engine clutch 130 is in a locked-up state.

When the engine clutch 130 is not locked up, it is difficult to control the speed of the input end of the transmission 150 through the torque control of the first motor 120, so the torque command part 243 may distribute the speed control torque only to the second motor 140. In other words, when the engine clutch 130 is not in a locked-up state, the torque command part 243 may distribute the speed control torque up to the maximum charging limit torque of the second motor 140 only to the second motor 140.

Contrarily, when the engine clutch 130 is locked up, the torque command part 243 may distribute the speed control torque to the first motor 120 as well as to the second motor 140. In other words, in the hybrid electric vehicle according to the embodiment, when the engine clutch 130 is locked up, the speed control torque up to the sum of the maximum charging limit torque of the first motor 120 and the maximum charging limit torque of the second motor 140 may be distributed to the first motor 120 connected directly to the engine 110 as well as to the second motor 140. Accordingly, the hybrid electric vehicle may secure a consistent and sophisticated shift feeling during shifting.

According to an embodiment of the present disclosure, when the engine clutch 130 is in a locked-up state, the hybrid electric vehicle may distribute the speed control torque sequentially to the second motor 140 and the first motor 120 or may distribute the speed control torque to each of the first motor 120 and the second motor 140 according to a distribution order determined by the efficiency of the motor. A method of distributing torque in the order of the second motor 140 and the first motor 120 is described below in detail with reference to FIG. 4. A method of distributing torque to each of the first motor 120 and the second motor 140 according to the distribution order is described in detail with reference to FIG. 8.

Figure 4:
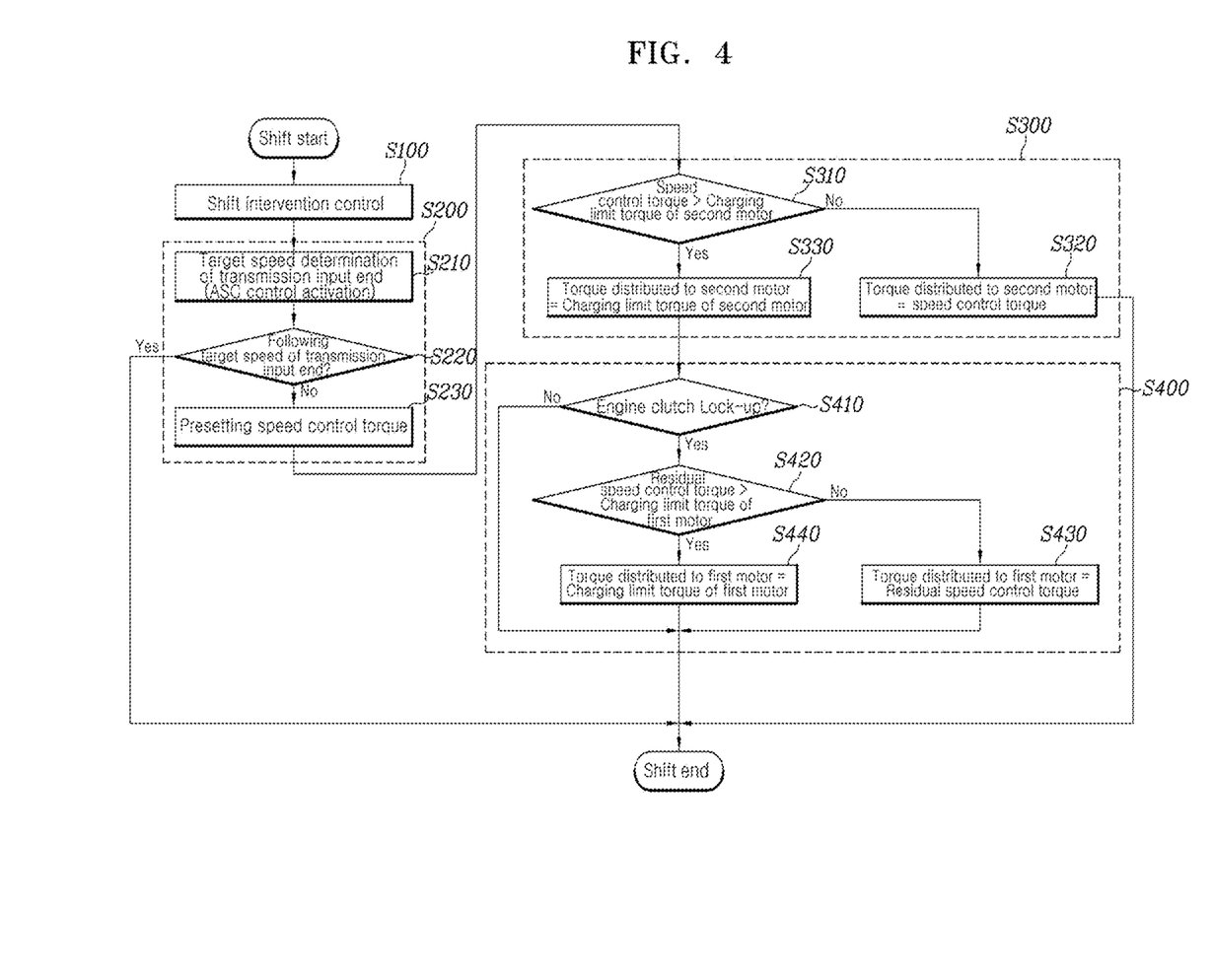
FIG. 4 is a flowchart for describing the shift control method of a hybrid electric vehicle according to the embodiment of the present disclosure.

FIG. 4 is a flowchart for describing the shift control method of a hybrid electric vehicle according to the embodiment of the present disclosure.

Referring to FIG. 4, the shift control method of a hybrid electric vehicle according to an embodiment of the present disclosure may include: performing the intervention control at S100, determining the speed control torque at S200, distributing torque to the second motor 140 at S300, and torque to the first motor 120 at S400.

In the performing of the intervention control at S100, when receiving a shift signal from the transmission controller 250, the intervention control part 241 may calculate an intervention control torque, and the torque command part 243 may control torque for at least one of the engine 110, the first motor 120, or the second motor 140 as much as the calculated intervention control torque.

In the determining of the speed control torque at S200, when receiving a shift signal from the transmission controller 250, the target speed determination part 245 may determine the speed control torque on the basis of the result of comparing the speed of the input end of the transmission 150 with the target speed of the input end of the transmission 150.

More specifically, the determining of the speed control torque at S200 may include determining the target speed of the input end of the transmission 150 at S210, determining whether the speed of the input end of the transmission 150 follows the target speed of the input end of the transmission 150 at S220, and presetting the speed control torque on the basis of the result of the determinations at S230.

In the determining of the target speed of the input end of the transmission 150 at S210, when the active shift control (ASC) mode is activated, the target speed determination part 245 may determine the target speed of the input end of the transmission 150 on the basis of the speed of the output end of the transmission 150 and the gear ratio of the target shift stage.

In the determining of whether the speed of the input end of the transmission 150 follows the target speed of the input end of the transmission 150 at S220, the speed control torque determination part 247 may determine whether the speed of the input end of the transmission 150 follows the target speed of the input end of the transmission 150 on the basis of the result of comparing a difference between the speed of the input end of the transmission 150 and the target speed of the input end of the transmission 150 with a preset value. For example, when the difference between the speed of the input end of the transmission 150 and the target speed of the input end of the transmission 150 is smaller than the preset value, the speed control torque determination part 247 may determine that the speed of the input end of the transmission 150 follows the target speed of the input end of the transmission 150. Contrarily, when the difference between the speed of the input end of the transmission 150 and the target speed of the input end of the transmission 150 is the preset value or more, the speed control torque determination part 247 may determine that the speed of the input end of the transmission 150 does not follow the target speed of the input end of the transmission 150.

In the presetting of the speed control torque at S230, when it is determined that the speed of the input end of the transmission 150 does not follow the target speed of the input end of the transmission 150, the speed control torque determination part 247 may preset a torque corresponding to the difference between the speed of the input end of the transmission 150 and the target speed of the input end of the transmission 150 as the speed control torque.

In the distributing of the torque to the second motor 140 at S300, the torque command part 243 may distribute the speed control torque to the second motor 140 connected directly to the input end of the transmission 150. More specifically, the distributing of the torque to the second motor 140 at S300 may include: comparing the speed control torque with the charging limit torque of the second motor 140 at S310; presetting a torque distributed to the second motor 140 as the speed control torque when the speed control torque is the charging limit torque of the second motor 140 or less at S320; and presetting a torque distributed to the second motor 140 as the charging limit torque of the second motor 140 when the speed control torque is greater than the charging limit torque of the second motor 140 at S330.

In the distributing of the torque to the first motor 120 at S400, when the speed control torque is greater than the charging limit torque of the second motor 140, a residual speed control torque (i.e., a difference between the speed control torque and the charging limit torque of the second motor 140) may be distributed to the first motor 120 connected selectively to the second motor 140 through the engine clutch 130 on the basis of whether the engine clutch 130 is locked up. More specifically, when the speed control torque is greater than the charging limit torque of the second motor 140, the distributing of the torque to the first motor 120 at S400 may include: determining whether the engine clutch 130 is locked up at S410; comparing the residual speed control torque with the charging limit torque of the first motor 120 when it is determined that the engine clutch 130 is locked up at S420; presetting a torque distributed to the first motor 120 as the residual speed control torque when the residual speed control torque is the charging limit torque of the first motor 120 or less at S430; and presetting a torque distributed to the first motor 120 as the charging limit torque of the first motor 120 when the residual speed control torque is greater than the charging limit torque of the first motor 120 at S440.

Figure 5:
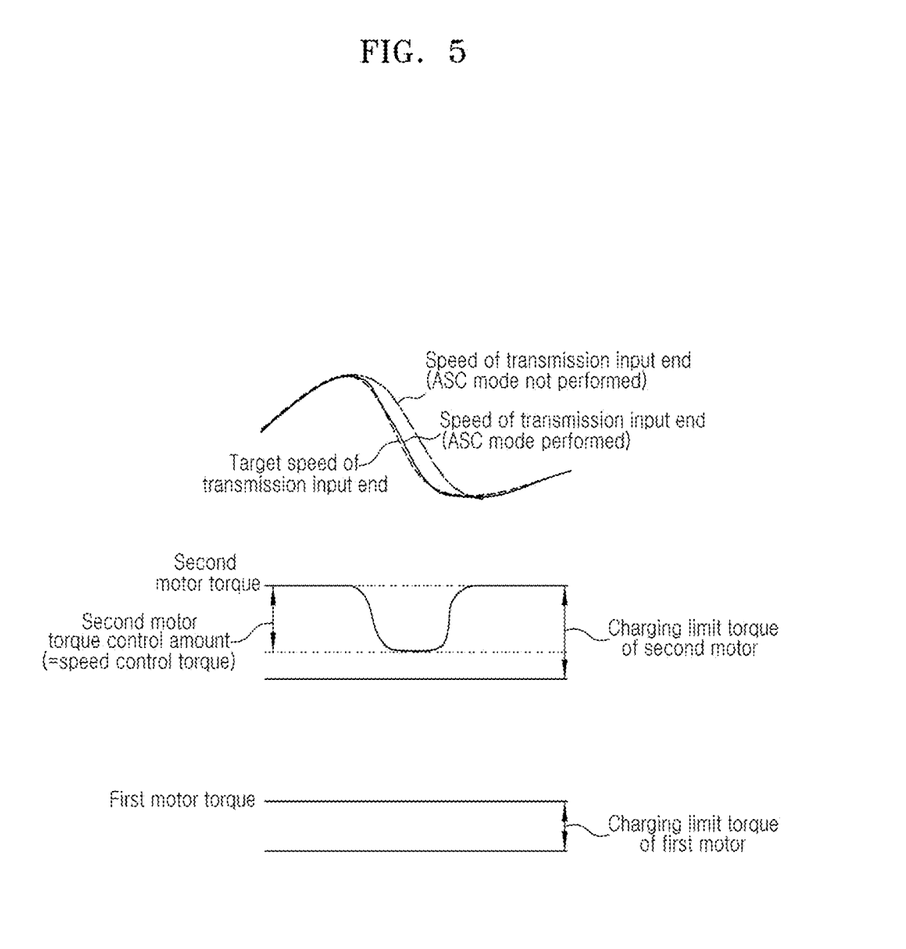
FIGS. 5, 6, and 7 are views illustrating the process of a shift control operation according to the shift control method of a hybrid electric vehicle shown in FIG. 4.
Figure 6:
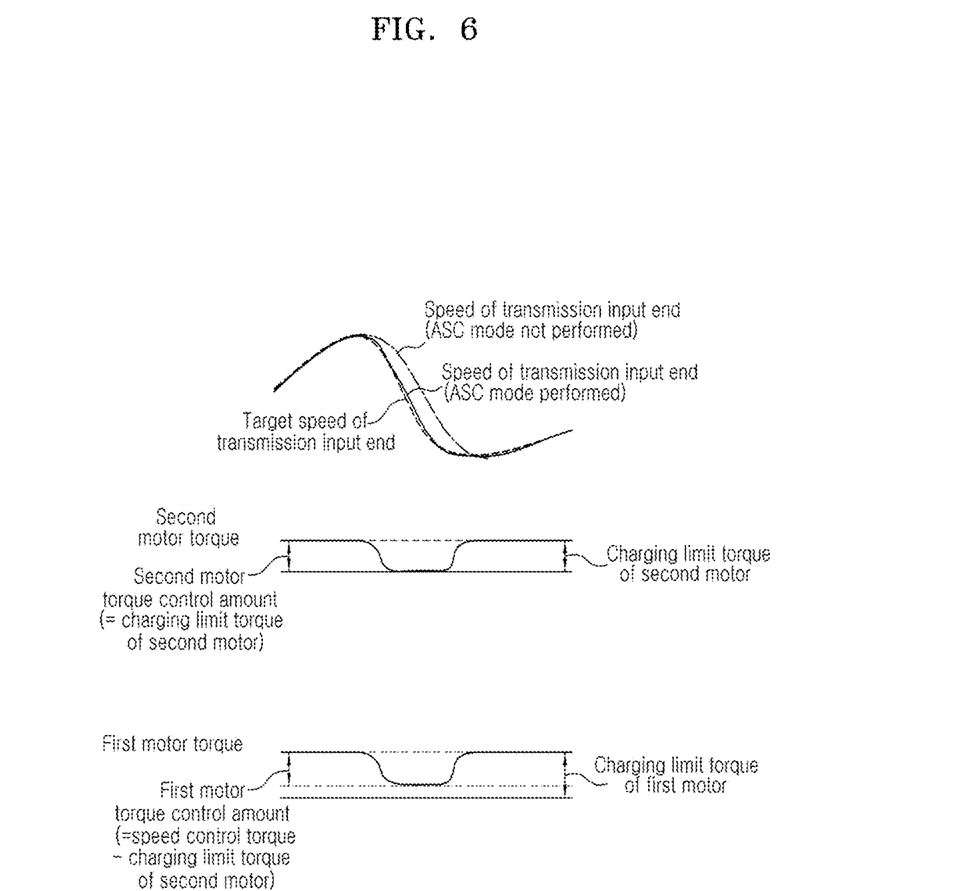
Figure 7:
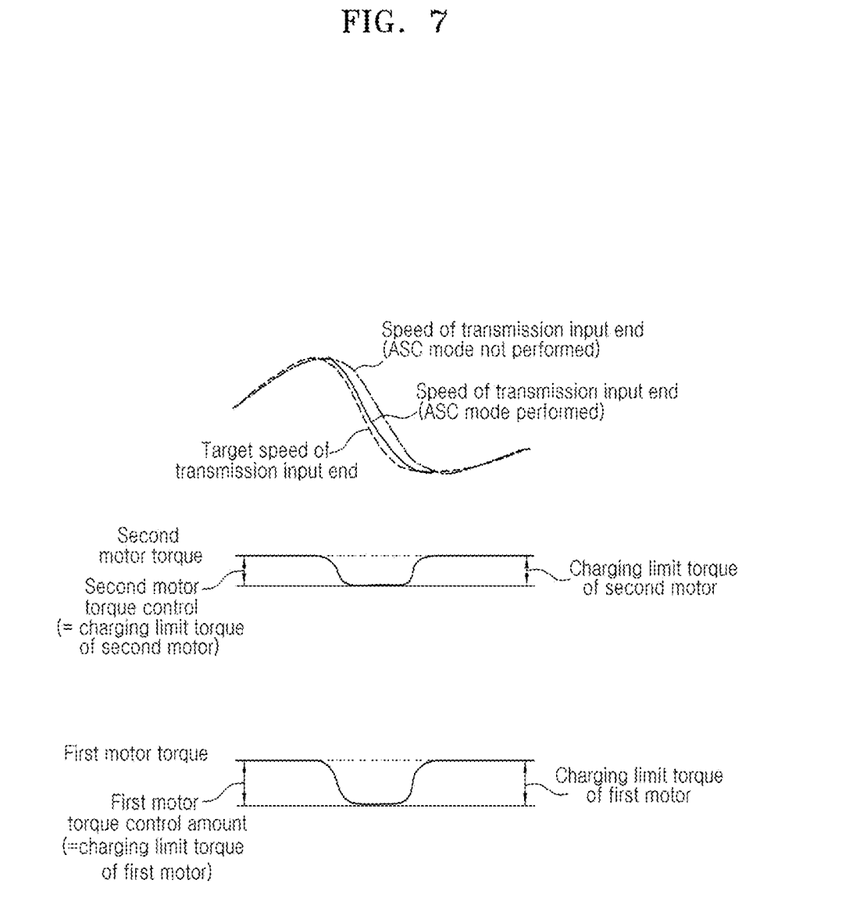

FIGS. 5, 6, and 7 are views illustrating the process of a shift control operation according to the shift control method of a hybrid electric vehicle shown in FIG. 4.

FIG. 5 is a view corresponding to a case in which the speed control torque is the charging limit torque of the second motor 140 or less when the engine clutch 130 is not in a locked-up state or is in the locked-up state. Referring to FIG. 5, it can be seen that when the active shift control (ASC) mode is not performed, there is a difference between the speed of the input end of the transmission 150 and the target speed of the input end of the transmission 150. On the other hand, when the active shift control (ASC) mode is performed, the hybrid controller unit 240 may control the torque of the second motor 140 by a speed control torque corresponding to a difference between the speed of the input end of the transmission 150 and the target speed of the input end of the transmission 150. Accordingly, the speed of the input end of the transmission 150 may follow the target speed of the input end of the transmission 150, and the hybrid electric vehicle may secure a consistent and sophisticated shift feeling during shifting.

FIG. 6 is a view corresponding to a case in which, when the engine clutch 130 is in a locked-up state, the speed control torque is greater than the charging limit torque of the second motor 140, but the residual speed control torque (i.e., a difference between the speed control torque and the charging limit torque of the second motor 140) is the charging limit torque of the first motor 120 or less. Referring to FIG. 6, when the active shift control (ASC) mode is performed, the hybrid controller unit 240 may control the torque of the second motor 140 by the charging limit torque of the second motor 140 and may control the torque of the first motor 120 by the residual speed control torque. Accordingly, in the hybrid electric vehicle, even if the speed control torque is greater than the charging limit torque of the second motor 140, the residual speed control torque is distributed to the first motor 120 such that the speed of the input end of the transmission 150 can be controlled to follow the target speed of the input end of the transmission 150.

FIG. 7 is a view corresponding to a case in which when the engine clutch 130 is in a locked-up stat, the speed control torque is greater than the sum of the charging limit torque of the second motor 140 and the charging limit torque of the first motor 120. Referring to FIG. 7, when the active shift control (ASC) mode is performed, the hybrid controller unit 240 may control the torque of the second motor 140 by the charging limit torque of the second motor 140 and may control the torque of the first motor 120 by the charging limit torque of the first motor 120. In other words, the hybrid electric vehicle may control the speed of the input end of the transmission 150 to closely follow the target speed of the input end of the transmission 150 compared to when controlling only the torque of the second motor 140 in the active shift control (ASC) mode.

Figure 8:
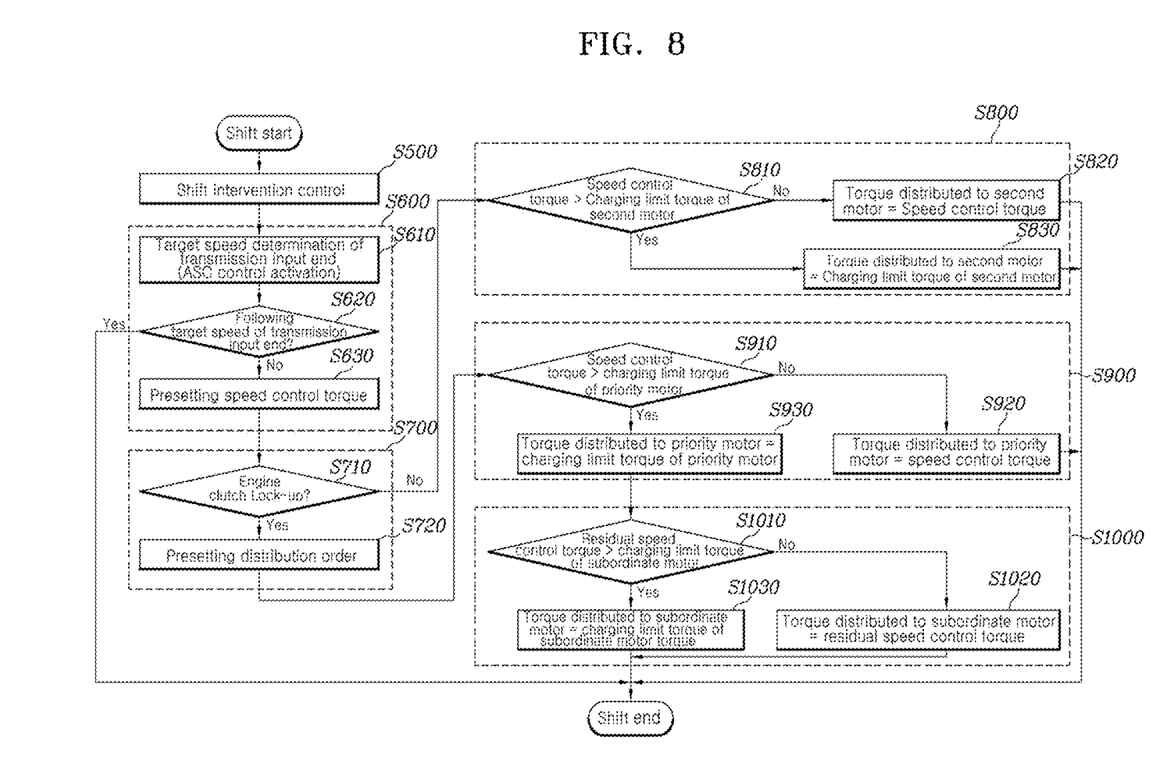
FIG. 8 is a flowchart for describing the shift control method of a hybrid electric vehicle according to another embodiment of the present disclosure.

FIG. 8 is a flowchart for describing the shift control method of a hybrid electric vehicle according to another embodiment of the present disclosure.

Referring to FIG. 8, the shift control method of a hybrid electric vehicle according to the another embodiment of the present disclosure may include: performing the intervention control at S500; determining the speed control torque at S600; determining a distribution order of torque on the basis of whether the engine clutch 130 is locked up at S700; distributing torque to the second motor 140 at S800; distributing torque to a priority motor of the first motor 120 and the second motor 140 at S900; and distributing torque to a subordinate motor of the first motor 120 and the second motor 140 at S1000.

The performing of the intervention control at S500 and the determining of the speed control torque at S600 are implemented in the same manner as the performing of the intervention control at S100 and the determining of the speed control torque at S200, respectively, shown in FIG. 4, so detailed description thereof has been omitted.

In the determining of the distribution order at S700, the torque command part 243 may determine the order of distributing torque to each of the first motor 120 and the second motor 140 on the basis of whether the engine clutch 130 is locked up. The determining of the distribution order at S700 may include determining whether the engine clutch 130 is locked up at S710 and presetting the order of distributing torque to each of the first motor 120 and the second motor 140 on the basis of the result of comparing the efficiency of the first motor 120 with the efficiency of the second motor 140 when it is determined that the engine clutch 130 is locked up at S720. For example, in the presetting of the distribution order at S720, a motor having higher efficiency among the first motor 120 and the second motor 140 may be preset as a priority motor. A motor having less efficiency among the first motor 120 and the second motor 140 may be preset as a subordinate motor.

In the distributing of torque to the second motor 140 at S800, when it is determined that the engine clutch 130 is not locked up, the torque command part 243 may distribute the speed control torque to the second motor 140. More specifically, the distributing of torque to the second motor 140 at S800 may include: comparing the speed control torque with the charging limit torque of the second motor 140 at S810; presetting a torque distributed to the second motor 140 as the speed control torque when the speed control torque is the charging limit torque of the second motor 140 or less at S820; and presetting a torque distributed to the second motor 140 as the charging limit torque of the second motor 140 when the speed control torque is greater than the charging limit torque of the second motor 140 at S830.

In the distributing of torque to the priority motor at S900, the torque command part 243 may distribute the speed control torque to the priority motor of the first motor 120 and the second motor 140. More specifically, the distributing of torque to the priority motor at S900 may include: comparing the speed control torque with the charging limit torque of the priority motor at S910; presetting a torque distributed to the priority motor as the speed control torque when the speed control torque is the charging limit torque of the priority motor or less at S920; and presetting a torque distributed to the priority motor as the charging limit torque of the priority motor when the speed control torque is greater than the charging limit torque of the priority motor at S930.

In the distributing of torque to the subordinate motor at S1000, when the speed control torque is greater than the charging limit torque of the priority motor, the torque command part 243 may distribute the residual speed control torque (i.e., a difference between the speed control torque and the charging limit torque of the priority motor) to the subordinate motor of the first motor 120 and the second motor 140. More specifically, the distributing of torque to the subordinate motor at S1000 may include: comparing the residual speed control torque with the charging limit torque of the subordinate motor at S1010; presetting a torque distributed to the subordinate motor as the residual speed control torque when the residual speed control torque is the charging limit torque of the subordinate motor or less at S1020; and presetting a torque distributed to the subordinate motor as the charging limit torque of the subordinate motor when the residual speed control torque is greater than the charging limit torque of the subordinate motor at S1030.

Meanwhile, the present disclosure described above may be implemented as computer-readable code in a medium in which a program is recorded. Computer-readable media include all types of recording devices in which data readable by a computer system is stored. Examples of the computer-readable media include a hard disk drive (HDD), a solid state disk (SSD), a silicon disk drive (SDD), ROM, RAM, CD-ROM, magnetic tape, floppy disk, and an optical data storage device, etc. Accordingly, the above detailed description should not be construed as restrictive in all respects and should be considered as illustrative. The scope of the present disclosure should be determined by the reasonable interpretation of the appended claims, and all modifications within the scope of equivalents of the present disclosure are included in the scope of the present disclosure.

What is claimed is:

1. A shift control method of a hybrid electric vehicle, the method comprising:
   determining a speed control torque based on a result of comparing a speed of an input end of a transmission with a target speed of the input end of the transmission according to a shift signal;
   distributing the speed control torque to a second motor connected directly to the input end of the transmission; and
   distributing a residual speed control torque to a first motor connected selectively to the second motor through an engine clutch based on whether the engine clutch is locked up when the speed control torque is greater than a charging limit torque of the second motor.

2. The method of claim 1, wherein the first motor is disposed between an engine and the engine clutch so as to be connected directly to the engine, and
   wherein the second motor is disposed between the engine clutch and the input end of the transmission.

3. The method of claim 1, wherein the determining of the speed control torque comprises:
   determining the target speed of the input end of the transmission based on a speed of an output end of the transmission and a gear ratio of a target shift stage when an active shift control mode is activated;
   determining whether the speed of the input end of the transmission follows the target speed of the input end of the transmission; and
   presetting a torque corresponding to a difference between the speed of the input end of the transmission and the target speed of the input end of the transmission as the speed control torque when it is determined that the speed of the input end of the transmission does not follow the target speed of the input end of the transmission.

4. The method of claim 1, wherein the distributing of the speed control torque to the second motor comprises:
   is comparing the speed control torque with the charging limit torque of the second motor;

presetting the torque distributed to the second motor as the speed control torque when the speed control torque is the charging limit torque of the second motor or less; and presetting the torque distributed to the second motor as the charging limit torque of the second motor when the speed control torque is greater than the charging limit torque of the second motor.

5. The method of claim 1, wherein the charging limit torque of the second motor is determined by at least one of a SOC (State of Charge) of a battery, an internal temperature of the battery, or an internal temperature of the second motor.

6. The method of claim 1, wherein the distributing of the residual speed control torque to the first motor comprises:
determining whether the engine clutch is locked up when the speed control torque is greater than the charging limit torque of the second motor;
comparing the residual speed control torque with a charging limit torque of the first motor when it is determined that the engine clutch is locked up;
presetting a torque distributed to the first motor as the residual speed control torque when the residual speed control torque is the charging limit torque of the first motor or less; and
presetting a torque distributed to the first motor as the charging limit torque of the first motor when the residual speed control torque is greater than the charging limit torque of the first motor,
wherein the residual speed control torque is preset as a difference between the speed control torque and the charging limit torque of the second motor.

7. The method of claim 6, wherein the charging limit torque of the first motor is determined by at least one of a SOC (State of Charge) of a battery, an internal temperature of the battery, or an internal temperature of the first motor.

8. A shift control method of a hybrid electric vehicle, the method comprising:
determining a speed control torque based on a result of comparing a speed of an input end of a transmission with a target speed of the input end of the transmission according to a shift signal;
determining an order of distributing the speed control torque to each of a first motor connected directly to an engine and a second motor connected directly to the input end of the transmission based on whether an engine clutch is locked up;
distributing the speed control torque to a priority motor of the first motor and the second motor; and
distributing a residual speed control torque to a subordinate motor of the first motor and the second motor when the speed control torque is greater than a charging limit torque of the priority motor.

9. The method of claim 8, wherein the first motor is disposed between the engine and the engine clutch, and
wherein the second motor is disposed between the engine clutch and the input end of the transmission.

10. The method of claim 8, wherein the determining of the speed control torque comprises:
determining the target speed of the input end of the transmission based on a speed of an output end of the transmission and a gear ratio of a target shift stage when an active shift control mode is activated;
determining whether the speed of the input end of the transmission follows the target speed of the input end of the transmission; and presetting a torque corresponding to a difference between the speed of the input end of the transmission and the target speed of the input end of the transmission as the speed control torque when it is determined that the speed of the input end of the transmission does not follow the target speed of the input end of the transmission.

11. The method of claim 8, wherein the determining of the distributing order comprises:
determining whether the engine clutch is locked up; and
presetting the distributing order based on a result of comparing an efficiency of the first motor with an efficiency of the second motor when it is determined that the engine clutch is locked up.

12. The method of claim 8, further comprising:
distributing the speed control torque to the second motor when it is determined that the engine clutch is not locked up.

13. The method of claim 8, wherein the distributing of the speed control torque to the priority motor comprises:
comparing the speed control torque with the charging limit torque of the priority motor;
is presetting a torque distributed to the priority motor as the speed control torque when the speed control torque is the charging limit torque of the priority motor or less; and
presetting a torque distributed to the priority motor as the charging limit torque of the priority motor when the speed control torque is greater than the charging limit torque of the priority motor.

14. The method of claim 8, wherein the distributing of the residual speed control torque to the subordinate motor comprises:
comparing the residual speed control torque with the charging limit torque of the subordinate motor when the speed control torque is greater than the charging limit torque of the priority motor;
presetting a torque distributed to the subordinate motor as the residual speed control torque when the residual speed control torque is the charging limit torque of the subordinate motor or less; and
presetting a torque distributed to the subordinate motor as the charging limit torque of the subordinate motor when the residual speed control torque is greater than the charging limit torque of the subordinate motor,
wherein the residual speed control torque is preset as a difference between the speed control torque and the charging limit torque of the priority motor.

15. A hybrid electric vehicle comprising:
an engine;
a first motor connected directly to the engine;
an engine clutch connected directly to the first motor;
a second motor selectively connected to the first motor through the engine clutch;
a transmission having an input end connected directly to the second motor;
a first controller configured to determine whether the transmission is required to be shifted; and
a second controller configured to determine a speed control torque based on a result of comparing a speed of the input end of the transmission with a target speed of the input end of the transmission when receiving a shift signal from the first controller, configured to distribute the speed control torque to the second motor and configured to distribute a residual speed control torque to the first motor based on whether the engine clutch is locked up when the speed control torque is greater than a charging limit torque of the second motor.

16. The hybrid electric vehicle of claim 15, wherein the speed control torque corresponds to a difference between the speed of the input end of the transmission and the target speed of the input end of the transmission.

17. The hybrid electric vehicle of claim 16, wherein the target speed of the input end of the transmission is determined based on a speed of an output end of the transmission and a gear ratio of a target shift stage.

18. The hybrid electric vehicle of claim 15, wherein the second controller presets a torque distributed to the second motor as the speed control torque when the speed control torque is the charging limit torque of the second motor or less, and the second controller presets a torque distributed to the second motor as the charging limit torque of the second motor when the speed control torque is greater than the charging limit torque of the second motor.

19. The hybrid electric vehicle of claim 15, wherein the second controller distributes the residual speed control torque to the first motor when the speed control torque is greater than the charging limit torque of the second motor and when the engine clutch is locked up,
  wherein the residual speed control torque is preset as a difference between the speed control torque and the charging limit torque of the second motor.

* * * * *

UNITED STATES PATENT AND TRADEMARK OFFICE
CERTIFICATE OF CORRECTION

| | | |
|---|---|---|
| PATENT NO. | : 12,311,914 B2 | Page 1 of 1 |
| APPLICATION NO. | : 17/944576 | |
| DATED | : May 27, 2025 | |
| INVENTOR(S) | : Seul Gi Lee et al. | |

It is certified that error appears in the above-identified patent and that said Letters Patent is hereby corrected as shown below:

In the Claims

Column 12, Claim 4, Line 66 - delete "is"

Column 14, Claim 13, Line 24 - delete "is"

Signed and Sealed this
Twenty-second Day of July, 2025

Coke Morgan Stewart
*Acting Director of the United States Patent and Trademark Office*